Oct. 15, 1957  S. B. COHN  2,810,111
WAVE GUIDE CORNER
Original Filed Nov. 25, 1950

INVENTOR
SEYMOUR B. COHN
BY
C. V. Craddock
ATTORNEY

United States Patent Office 2,810,111
Patented Oct. 15, 1957

1

2,810,111

WAVE GUIDE CORNER

Seymour B. Cohn, Palo Alto, Calif., assignor to Sperry Rand Corporation, a corporation of Delaware Original application November 25, 1950, Serial No. 197,621. Divided and this application May 5, 1954, Serial No. 427,782

4 Claims. (Cl. 333—98)

The present invention relates to wave guide corners, and in particular to E-plane wave guide corners for propagating transverse electric waves.

The present application is a division of my copending application Serial No. 197,621, filed November 25, 1950, now abandoned.

An object of the present invention is to provide an improved E-plane wave guide corner.

Another object of the invention is to provide a simplified wave guide corner which is inexpensive to manufacture.

Yet another object of the present invention is to provide a compact wave guide corner providing negligible reflection of electromagnetic energy over an appreciable frequency band width.

A further object is to provide an E-plane wave guide corner having a relatively large power handling capacity.

In accordance with the present invention, there is introduced an improved E-plane wave guide corner for propagating transverse electric waves formed of two sections of hollow rectangular wave guide angularly disposed with respect to each other and conductively joined together. Each wave guide section has a pair of broad walls and a pair of narrow walls. The E-plane corner is formed with the narrow walls of the wave guide sections extending parallel to each other. A conductive post is inserted within the wave guide corner substantially in the plane of symmetry of the joined wave guide sections to minimize reflection of electromagnetic energy and improve the band width of the corner. The conductive post extends perpendicular to the narrow walls of the wave guide sections. In one embodiment of the invention, the conductive post extends between and conductively joins opposite narrow walls of the wave guide sections, and the post is spaced apart from the broad walls of the wave guide sections. In another embodiment of the invention, the conductive post is contiguous with the corresponding broad walls of the wave guide sections forming the inside of the E-plane corner.

The above objects of and the brief introduction to the present invention will be more fully understood and further objects and advantages will become apparent from a careful study of the following detailed description in connection with the drawings, wherein.

2

Figure 1:
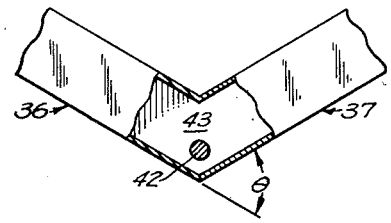
Fig. 1 shows a partial sectional view of an E-plane wave guide corner in accordance with one embodiment of the present invention.

Referring to Fig. 1, a wave guide corner is shown constructed of two straight sections of hollow rectangular wave guide 36 and 37 disposed at an angle $\theta$ with respect to each other. The wave guide sections are conductively joined together by soldering or brazing to form a closed corner 43 with the narrow walls of one wave guide section substantially parallel to the narrow walls of the other wave guide section, thereby forming an E-plane wave guide corner. Each wave guide section is dimensioned to propagate electromagnetic energy in the dominant or $TE_{10}$ mode. The wave guide sections possess highly conductive interior surfaces to minimize electromagnetic energy loss.

The reflection of electromagnetic energy to be propagated around the corner 43 is minimized by a conductive post or obstacle 42 situated within the wave guide corner in a junction plane or plane of symmetry of the wave guide sections 36 and 37. The junction plane or plane of symmetry of the wave guide corner is substantially perpendicular to the narrow walls of the wave guide sections 36 and 37, and extends along the bisector of the angle between the wave guide sections. The axis of the post 42 substantially coincides with the plane of symmetry, and extends in a direction substantially perpendicular to the narrow walls of the wave guide sections. The conductive post extends between and conductively joins opposite narrow walls of the wave guide sections. The axis of post 42 is substantially perpendicular to the direction of the electric-field vector of the electromagnetic energy to be propagated around the wave guide corner.

The wave guide corner of Fig. 1 is of simple construction and is inexpensive to manufacture. After the ends of the wave guide sections are conductively joined together forming a closed corner, suitable holes may be formed in both the upper and lower narrow walls at the plane of symmetry. The conductive post 42 of suitable diameter is inserted within the corner and conductively joined to the narrow walls by soldering or brazing. By the proper choice of the diameter and position of post 42, a wave guide corner having negligible reflection of electromagnetic energy over a wide frequency band may be obtained. By way of illustration, an E-plane wave guide corner in accordance with Fig. 1 may be constructed of two sections of rectangular wave guide each having internal cross-sectional dimensions of 1.122 x 0.497 inches. The wave guide sections may be disposed with respect to each other at an angle $\theta$ equal to 60°. A conductive cylindrical post 42 having a diameter of 0.165 inch is situated in the plane of symmetry of the wave guide corner such that the axis of the post is located at a distance of 0.138 inch from the inner surface of each outer broad wall of the wave guide corner, the distance being measured along a perpendicular line from the inner surfaces of the broad wall to the axis of the post. Such a wave guide corner was found to possess a voltage standing wave ratio not exceeding 1.06 over a frequency range from 6,600 to 10,000 megacycles per second.

A similar wave guide corner to that of Fig. 1 but with the wave guide sections disposed with respect to each other at an angle $\theta$ equal to 45° and having a post 42 of diameter equal to 0.130 inch with the axis of the post spaced perpendicularly from the inside surface of the outer broad walls a distance of 0.129 inch, was found to possess a voltage standing wave ratio not exceeding 1.025 over the frequency range from 6,300 to 10,900 megacycles per second.

Figure 2:
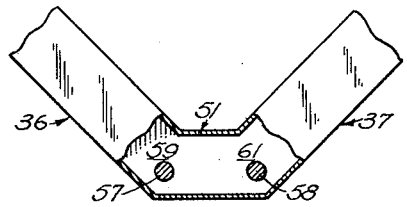
Fig. 2 is a partial sectional view of an alternative E-plane wave guide corner.

Fig. 2 shows an alternative wave guide corner formed of three sections of hollow rectangular wave guide 36, 51, and 37, the sections 36 and 51 forming an E-plane corner 59 and the sections 51 and 37 forming an E-plane corner 61. Conductive posts 57 and 58 are situated within the wave guide corners 59 and 61 along the planes of symmetry of the sections in the same manner as taught in connection with Fig. 1. Each of the corners 59 and 61 of Fig. 2 may be similar to the corner 43 of Fig. 1.

The embodiments illustrated in Figs. 1 and 2 are not limited to the example presented, and suitable E-plane corners may be constructed from various sizes of wave guide and with corners having different angles. The wave guide corners may employ conductive posts having a wide range of diameters and spacings.

Figure 3:
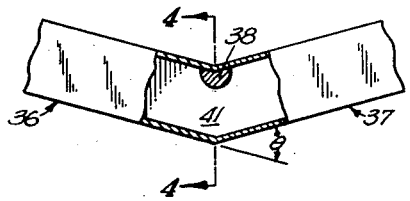
Fig. 3 is a partial sectional view of another embodiment of an E-plane wave guide corner of the present invention.
Figure 4:
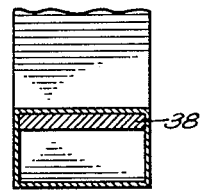
Fig. 4 is a cross-sectional view of the wave guide corner of Fig. 3 taken along lines 4—4.

Fig. 3 illustrates an alternative E-plane wave guide corner formed of two rectangular wave guide sections 36 and 37 joined together with a conductive post 38 having its axis extending along the line of junction of the wave guide sections and being contiguous with the edge of the broad walls forming the inside corner 41. Preferably, the post 38 is formed of a section of a cylinder having a smooth curved surface as shown to eliminate the sharp inner edge and enhance the power handling capacity of the wave guide corner. The post 38 extends between and conductively joins opposite narrow walls as shown in the cross-sectional view of Fig. 4.

This embodiment of the invention exhibits negligible reflection of electromagnetic energy over a broad frequency band. For example, in a wave guide corner having an angle $\theta$ equal to 45° between the wave guide sections 36 and 37 and with a post 38 of diameter equal to 0.125 inch with the axis of the post coinciding with the inner edge of the corner 41, a voltage standing wave ratio not exceeding 1.07 was obtained over the frequency range from 6,600 to 10,000 megacycles per second.

Figure 5:
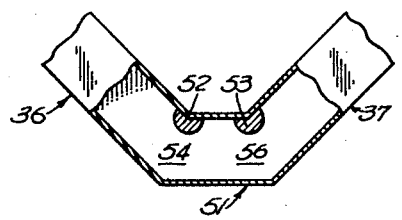
Figs. 5 and 6 are alternative embodiments of E-plane wave guide corners in accordance with the present invention.

Fig. 5 shows a further modification of the wave guide corner of Fig. 3 in which three sections of rectangular wave guide 36, 51, and 37 are interconnected in the same general manner as previously described in connection with Fig. 2. The angles between the intermediate rectangular wave guide section 51 and wave guide sections 36 and 37 are preferably equal to each other. Conductive posts 52 and 53 are situated within the wave guide corners 54 and 56 respectively, and are contiguous with the edges of the broad walls forming the inside of the corners 54 and 56 respectively, as explained in connection with Fig. 3.

Figure 6:
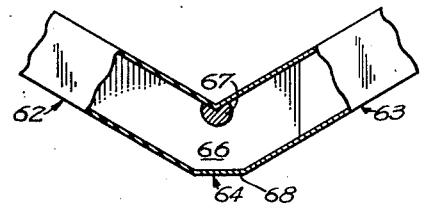

Fig. 6 shows yet another modification of the E-plane wave guide corner of Fig. 3 in which two rectangular wave guide sections 62 and 63 are disposed at an angle with respect to each other and are conductively joined together by an intermediate triangular-shaped section 64, thereby providing a corner 66. A conductive post 67 is contiguous with the edge of the broad walls forming the inside of corner 66 in the same manner as taught in connection with Fig. 3. The outer edge of the corner 66 is formed by a wall portion 68 whose plane is substantially perpendicular to the plane of symmetry of the wave guide sections 62 and 63.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Electromagnetic energy conveying means comprising first and second sections of hollow rectangular wave guide conductively joined together and forming a closed corner whereby energy may be substantially fully coupled from said first wave guide section to said second wave guide section, the longitudinal axis of said first wave guide section extending in a direction different from the direction of the longitudinal axis of said second wave guide section, said first and second wave guide sections each having a pair of broad walls and a pair of narrow walls, and conductive means situated within said closed corner and being contiguous with the junction of corresponding broad walls forming the inside of said corner, said conductive means extending across and conductively joining opposite narrow walls and having a smooth curved surface within the joined wave guide sections surrounding the inside of said corner.

2. The electromagnetic energy conveying means defined in claim 1 further including a third section of hollow rectangular wave guide conductively joined to said second section of rectangular wave guide and forming a second closed corner whereby energy may be substantially fully coupled from said second wave guide section to said third wave guide section, the longitudinal axis of said third wave guide section extending in a direction different from the direction of the longitudinal axis of said second wave guide section, said third wave guide section having a pair of broad walls and a pair of narrow walls, and conductive means situated within said second closed corner and being contiguous with the junction of corresponding broad walls forming the inside of said second corner, said conductive means extending across and conductively joining opposite narrow walls and having a smooth curved surface within the joined wave guide sections surrounding the inside of said corner.

3. A wave guide conduit means for propagating transverse electric waves comprising a pair of straight sections of rectangular wave guide, each of said wave guide sections having a pair of broad walls and a pair of narrow walls, the electric vector of an applied transverse electric wave extending substantially parallel to said narrow walls, the longitudinal axis of one of said wave guide sections extending in a direction different from the direction of the longitudinal axis of said other wave guide section, said longitudinal axes intersecting at a point thereby forming an angle bounded by said longitudinal axes, said first and second wave guide sections being conductively joined together about said point and forming a closed E-plane corner whereby energy may be substantially fully coupled from one of said wave guide sections to the other wave guide section, and a conductive post means situated within said conduit means and lying within a plane defined by the bisector of the angle bounded by said longitudinal axes, said plane being substantially perpendicular to the narrow walls of said wave guide sections, wherein said conductive post means is contiguous with one of the junctions of corresponding broad walls of said wave guide sections, said post means extending substantially perpendicular to and conductively joining opposite narrow walls of said wave guide sections.

4. The wave guide conduit means as defined in claim 3 wherein said conductive post means situated within said conduit means is contiguous with the junction of corresponding broad walls of said wave guide sections forming the inside of said closed corner.

References Cited in the file of this patent

UNITED STATES PATENTS

| 2,411,338 | Roberts | Nov. 19, 1946 |
| 2,640,877 | Miller | June 2, 1953 |

OTHER REFERENCES

Pryce, "Wave Guides," The Journal of I. E. E., vol. 93, Pt. IIIA, page 37, published 1946. (Copy in 333–98.)